June 28, 1966     C. G. BYRD     3,258,758
TWO-LEVEL THRESHOLD DETECTORS
Filed Aug. 22, 1962
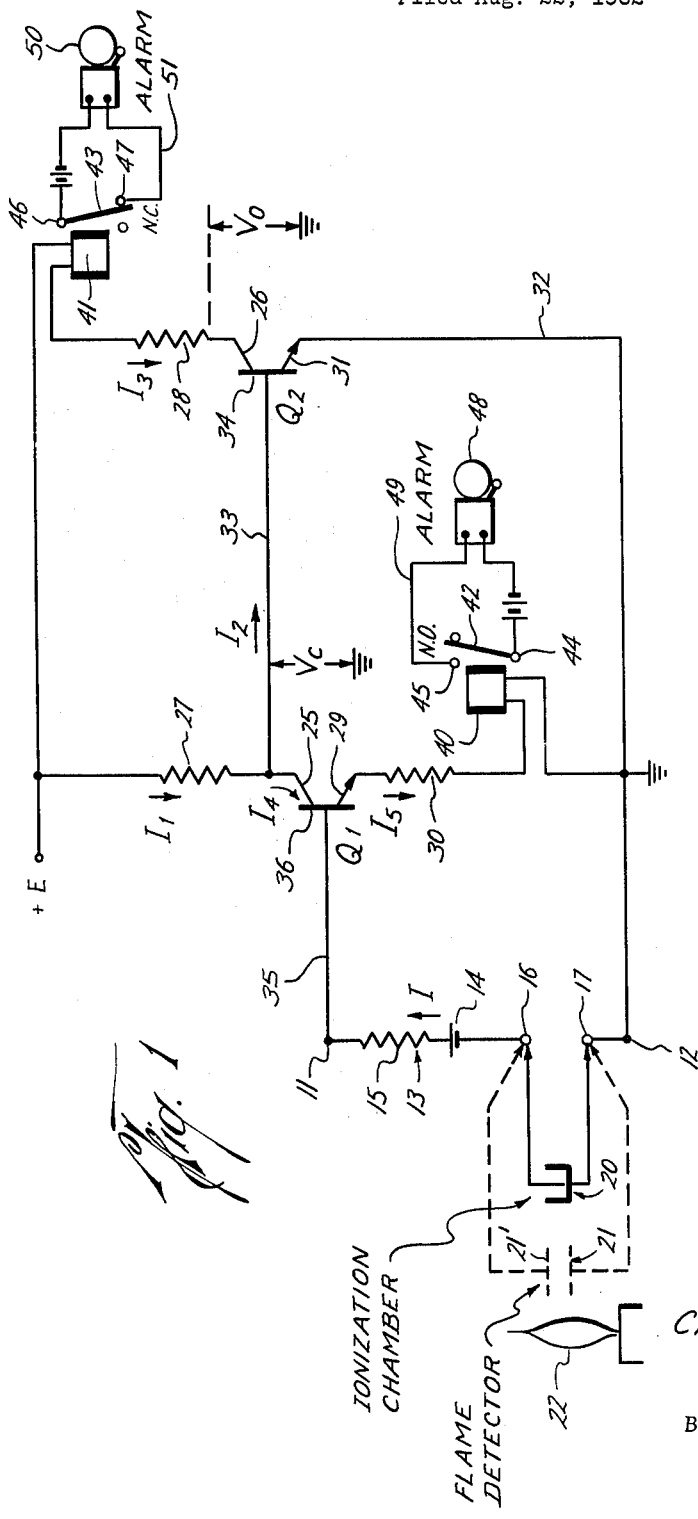
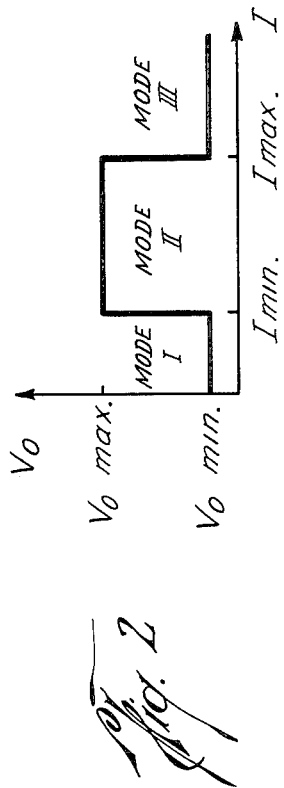
Clarence G. Byrd
INVENTOR.
BY *Michael P. Breston*
ATTORNEY United States Patent Office 3,258,758
Patented June 28, 1966

3,258,758
TWO-LEVEL THRESHOLD DETECTORS
Clarence G. Byrd, Sarasota, Fla., assignor to Electro-Mechanical Research, Inc., Sarasota, Fla., a corporation of Connecticut
Filed Aug. 22, 1962, Ser. No. 218,730
1 Claim. (Cl. 340—228)

This invention relates to two-level threshold detectors especially suitable for detecting when the flow of current in a monitoring circuit falls below a minimum value or exceeds a maximum value. The circuit can monitor various conditions such as the resistance value between two points, the presence of a flame, the radiation dose in an environment, etc.

Diverse types of two-level threshold detectors are known. Most of them, however, require too many components thereby appreciably increasing the cost of such detectors. In many applications, as in the several stages of a missile, the employed number of flame detectors, for example, is very great. For such and similar applications, compactness, light weight, reliability, and low cost are prime considerations.

Consequently, the objects of the present invention are to provide two-level threshold detectors which are compact, reliable, and relatively inexpensive to produce.

Other objects and advantages of the invention will become apparent from the following detailed description when considered in conjunction with the accompanying drawings in which:

FIG. 1 is a schematic, circuit diagram of a preferred embodiment of the invention; and FIG. 2 is a plot of the output versus input transfer characteristic curve of FIG. 1.

In FIG. 1, between terminals 11 and 12, is a monitoring circuit 13 for detecting when the flow of current I therein is below a minimum value $I_{min.}$ and above a maximum value $I_{max.}$. Circuit 13 may typically include an energy source 14, a current limiting resistor 15, and two input terminals 16 and 17.

Coupled to terminals 16 and 17 may be any active source or passive network of variable resistance such as an ion chamber 20, a flame detector 21 (represented by dotted lines) having two electrodes 21′ for detecting the presence of a flame 22, etc. Both the ion chamber 20 and the flame detector 21 have a common characteristic: each receives free ions when the former is exposed to a radiation dose and the latter to the flame 22. Because ions are charged particles, their number determines the amplitude of the current I flowing in the monitoring circuit 13. Conversely, the amplitude of I indicates the intensity of the background dose of radiation in one case, and the intensity of the flame in the other. In the absence of radiation or of combustion, the resistance between input terminals 16, 17 is too high for any appreciable current I to flow therebetween.

To detect when the monitored current I reaches its minimum and maximum threshold levels, a two-stage transistor circuit, including two NPN transistors $Q_1$ and $Q_2$, is provided. Of course, by reversing the polarities of the energizing sources, PNP transistors could equally be employed. Collectors 25, 26 of transistors $Q_1$ and $Q_2$ are coupled respectively to the +E terminal via a high-valued resistor 27 and a relatively low-valued resistor 28. Emitter 29 of transistor $Q_1$ is connected to ground through a relatively low-valued resistor 30, whereas emitter 31 of transistor $Q_2$ is preferably directly tied to ground by a lead wire 32. Conductor 33 connects the collector 25 to the base 34 of transistor $Q_2$, and conductor 35 connects the monitoring circuit 13 to the base 36 of transistor $Q_1$.

To detect whether transistor $Q_1$ is conducting, the winding of a suitable relay 40 may be inserted in the emitter circuit of transistor $Q_1$. Similarly, to detect whether transistor $Q_2$ is conducting the winding of another relay 41 may be connected in the collector circuit of transistor $Q_2$. Relays 40 and 41, respectively, control armatures 42 and 43; armature 42 normally maintains contacts 44, 45 open when relay 40 is de-energized, whereas armature 43 normally maintains contacts 46, 47 closed when relay 41 is de-energized. The closing of contacts 44, 45 energizes a bell 48 in an alarm circuit 49 and the closing of contacts 46, 47 energizes a bell 50 in an alarm circuit 51.

The operation of the two-level threshold detector shown in FIG. 1 can best be understood with refernce to FIG. 2 which shows the voltage versus current transfer characteristic curve of the detector; the curve characterizes three distinct modes of operation.

In mode I, when the background radiation dose in chamber 20 (or the intensity of the flame in detector 21) falls short of its threshold level, the monitored current I is below its minimum threshold level $I_{min.}$ and hence transistor $Q_1$ is OFF thereby making its collector current $I_4$ negligible. Hence, current $I_2$ in conductor 33 is substantially equal to the current $I_1$ in resistor 27. Current $I_2$ forward-biases the base-emitter junction 31, 34 thereby turning transistor $Q_2$ ON and making the output voltage $V_o$, between collector 26 and ground, nearly equal to zero (on the order of a few tenths of a volt). When $Q_2$ is ON, current $I_3$ in its collector circuit has a relatively high value sufficient to energize relay 41 and, hence, to open the normally closed contacts 46, 47 of the alarm circuit 51. Because in mode I transistor $Q_1$ is OFF, relay 40 is also de-energized and contacts 44, 45 of the alarm circuit 49 are in their normally open position. In sum, during mode I, when the monitored current fails to reach $I_{min.}$, bells 48, 50 are not functioning.

In mode II, when the background radiation dose in chamber 20 (or the intensity of the flame 22 in the flame detector 21) exceeds its threshold value, the monitored current I rises above $I_{min.}$ thereby forward-biasing the base-emitter junction 29, 36, turning ON transistor $Q_1$ whose emitter current $I_5$ is sufficient to energize relay 40, closing contacts 44, 45, and activating bell 48. In this mode, a substantial portion of the nearly constant supply current $I_1$ flows as $I_4$ in the collector 25 of transistor $Q_1$. Hence, the base current $I_2$ in transistor $Q_2$, which is equal to $(I_1-I_4)$, decreases by a sufficient amount to cut transistor $Q_2$ OFF thereby reducing its collector current $I_3$ to a minimum. The output voltage $V_o$ then reaches its maximum value $V_{max.}$, relay 41 becomes de-energized closing contacts 46, 47 and activating bell 50. In sum, during mode II, when the monitored current I raises above $I_{min.}$, both bells 48 and 50 are operating.

Finally, in mode III the detector of the invention can detect an unreasonably large monitored current I which may be due, for example, to a short circuit in the monitoring circuit 13. In this mode, current I exceeds a maximum value $I_{max.}$ which saturates transistor $Q_1$ thereby raising its emitter voltage and hence its collector voltage to a maximum value $V_{c\ max.}$. This voltage $V_{c\ max.}$ is sufficient to forward-bias the base-emitter junction 31, 34 thereby turning transistor $Q_2$ ON. Thus, for reasons previously explained, when both transistors $Q_1$ and $Q_2$ are ON, relays 40 and 41 are energized and only bell 48 becomes activated.

To summarize, when the monitored current I is below its threshold level $I_{min.}$, both bells 48, 50 are de-energized; when current I exceeds its threshold level $I_{min.}$, both bells are energized thereby offering a double warning. Finally, when a defect occurs in the monitoring circuit 13, only bell 48 is activated thereby bringing to the operator's attention the existence of the defect.

Having thus described my invention with particular reference to a preferred form thereof and having shown and described particular applications, it will be obvious to those skilled in the art to which the invention pertains, after understanding my invention, that various changes and other modifications may be made therein without departing from the spirit and scope of my invention, as defined in the claim appended hereto.

What is claimed is:

A two-level threshold detector comprising:
a first and a second transistor, each transistor having at least a base, a collector and an emitter;
a direct current energizing source;
means connecting said energizing source to the collector of said first transistor;
means including a current indicating device, said indicating device having a first relay winding for coupling said energizing source to the collector of said second transistor;
means connecting each emitter to a reference potential level;
means coupling the collector of said first transistor to the base of said second transistor;
detecting means including a current generating source coupled between said reference potential and the base of said first transistor;
said current generating source being responsive to a sensed condition for generating a first current below a threshold level indicative of a safe mode of operation, and a second current above said threshold level indicative of a dangerous mode of operation;
said first transistor becoming substantially nonconducting in response to said first current thereby allowing a control current to flow from said energizing source into the base circuit of said second transistor whereby said second transistor becomes fully conducting and said current indicating device becomes indicative of said safe mode of operation;
said first transistor becoming substantially fully conducting in response to said second current thereby reducing said control current to a value which is insufficient to maintain said second transistor in its conduction state and said current indicating device becomes indicative of said dangerous mode of operation;
a first alarm circuit having two terminals, said first relay having an armature for breaking electrical contact between said terminals when said winding is energized and making contact between said terminals when said winding is de-energized; and
said emitter circuit of said first transistor including a second relay winding, and a second alarm circuit controllable by the energization of said second winding.

References Cited by the Examiner
UNITED STATES PATENTS

| | | |
|---|---|---|
| 666,737 | 1/1901 | Coleman. |
| 2,828,450 | 3/1958 | Pinckaers. |
| 2,956,168 | 10/1960 | Pinckaers _____ 250—83.3 X |
| 2,993,995 | 7/1961 | Pinckaers _____ 250—83.6 X |
| 3,076,897 | 2/1963 | Skirvin. |
| 3,150,311 | 9/1964 | Jones et al. |

NEIL C. READ, *Primary Examiner.*

ARCHIE R. BORCHELT, *Examiner.*

R. M. ANGUS, *Assistant Examiner.*